United States Patent
Hansel et al.

(10) Patent No.: US 8,535,578 B2
(45) Date of Patent: Sep. 17, 2013

(54) FLAME-RETARDANT WOOD-BASED MATERIALS

(75) Inventors: Jan-Gerd Hansel, Bergisch Gladbach (DE); Otto Mauerer, Leichlingen (DE); Maria Gärtner, Bergisch Gladbach (DE)

(73) Assignee: LANXESS Deutschland GmbH, Cologne (DE)

( * ) Notice: Subject to any disclaimer, the term of this patent is extended or adjusted under 35 U.S.C. 154(b) by 828 days.

(21) Appl. No.: 12/082,375

(22) Filed: Apr. 10, 2008

(65) Prior Publication Data

US 2011/0108782 A1    May 12, 2011

(30) Foreign Application Priority Data

Apr. 12, 2007   (DE) .......................... 10 2007 017 180

(51) Int. Cl.
- *C09K 21/00* (2006.01)
- *C09K 21/04* (2006.01)
- *C09K 21/12* (2006.01)
- *C01B 15/16* (2006.01)

(52) U.S. Cl.
USPC ............................ 252/607; 252/601; 423/305

(58) Field of Classification Search
USPC .................................. 252/601, 607; 423/305
See application file for complete search history.

(56) References Cited

U.S. PATENT DOCUMENTS

| | | | |
|---|---|---|---|
| 2,725,311 A | 11/1955 | Kenaga et al. | 117/136 |
| 3,285,774 A | 11/1966 | Goldstein et al. | 117/136 |
| 3,558,596 A | 1/1971 | Demott et al. | 260/218 |
| 3,886,205 A | 5/1975 | Geffers et al. | 260/502.4 |
| 4,252,857 A | 2/1981 | Heine et al. | 428/411 |
| 5,004,549 A | 4/1991 | Wood et al. | 210/699 |
| 5,151,225 A * | 9/1992 | Herndon et al. | 252/607 |
| 2006/0144533 A1* | 7/2006 | Thompson et al. | 162/72 |

FOREIGN PATENT DOCUMENTS

| | | |
|---|---|---|
| EP | 0037949 | 10/1981 |
| WO | WO 00/58725 | 10/2000 |

OTHER PUBLICATIONS

Jürgen Troitzsch, "Plastics Flammability Handbook", 2004, Carl Hanser Verlag, Munich; "Principles, Regulations, Testing, and Approval" 3rd Edition.
*Fire and Materials*, 2001, 25, 95-104; "Durability of Fire Retardant Treated Wood Products at Humid and Exterior Conditions (Review of Literature)"; Birgit Ostman et al.

* cited by examiner

*Primary Examiner* — Peter F Godenschwager
(74) *Attorney, Agent, or Firm* — Michael A. Miller

(57) ABSTRACT

The present invention relates to wood-base materials made flame-retardant with halogen-free organic phosphorus compounds, and to compositions and processes for their production and their use.

5 Claims, No Drawings

FLAME-RETARDANT WOOD-BASED MATERIALS

The present invention relates to wood-base materials made flame-retardant with halogen-free organic phosphorus compounds, and to compositions and processes for their production and their use.

BACKGROUND OF THE INVENTION

Wood and wood-base materials as well as other building materials, components and materials have to meet extensive requirements with regard to flameproof properties. Thus, for example, building materials can be classified according to DIN 4102, components for electrical equipment according to UL 94 or IEC-60695-2, components for railway vehicles according to DIN 5510 and furniture according to BS 5852 and can be made correspondingly flame-retardant for their use. Particular requirements are set, for example, for wood-base materials for the equipping of aircraft (e.g. FAR 25.853) or ships (e.g. IMO A.652(16)). An overview of numerous test and requirements is given, for example by Jürgen Troitzsch, "Plastics Flammability Handbook", 2004, Carl Hanser Verlag, Munich.

In addition, the fire protection requirements are constantly increasing. Thus, for example, new European standards which are intended to replace the national test standards to date set substantially higher fire protection requirements. The SBI test (EN 13823) makes it necessary, for example, to take account of not only the fire behaviour but also the fume density. The new standard intended for railway vehicles (prEN 45545) takes into account, for example, fume density and fume toxicity. Requirements with regard to the fume toxicity, which is often determined via the measurement of, inter alia, the hydrogen halide concentrations in the fumes, can, for example, make it impossible to use tried and tested halogen-containing flameproofing compositions. In addition, halogen-free flameproofing compositions are also preferred because the public has more faith in them with regard to product safety and environmental protection. For many fields of use for wood-base materials, this means that the tried and tested and functioning flameproofing treatment must be revised with regard to new requirements.

The flameproofing treatment of wood-base materials by treatment with chemicals is known. The most important treatment methods are the pressure process and coating. Flame-retardant coating of wood has the considerable disadvantage that the natural material wood loses its typical natural appearance in the building sector or as furniture material. Even if the coating is transparent, the appearance of the wood surface and possibilities for further processing are adversely affected, which may be undesired. More frequently used, therefore, is the pressure process in which the wood is brought into contact with a generally aqueous solution of a flameproofing composition, the take-up of a sufficient amount of flameproofing composition into the volume of the wood is achieved by suitable measures and finally drying is effected. Predominantly used flameproofing compositions are phosphorus-, nitrogen- and boron-containing substances. Examples of these are ammonium phosphate, urea or sodium tetraborate.

The flame-retardant treatment of wood by the pressure process with its salt-like flameproofing compositions is technically established and economical but has a number of disadvantages. In the case of the direct action of water, for example on the outer skin of buildings, the flameproofing compositions are dissolved out and the flame retardance declines. For this reason, flameproofing compositions which are fixed in the wood and cannot be leached out by water are used in particular for exterior applications. Examples of this are combinations of flameproofing compositions with a resin which is completely polymerized in the wood after the impregnation and binds the flameproofing compositions thereby, as described in U.S. Pat. No. 3,968,276. Alternatively, as disclosed in U.S. Pat. No. 3,558,596, reactive flameproofing compositions which are fixed to the wood by reaction can be introduced into the wood.

However, even if no direct water contact is to be feared, for example in the interior area of buildings, it is to be expected with the use of conventional flameproofing compositions that the equilibrium moisture content will be increased. Poorer dimensional stability of the wood components, corrosion at nails, screws and fittings and a higher susceptibility to microbial attack may result therefrom. Thus, it is known from *Fire and Materials* 2001, 25, 95-104 that owing to their nutrient effect, flameproofing compositions based on ammonium phosphate or urea can promote an attack by wood-decomposing moulds.

Furthermore, a flame-retardant treatment of the wood may have disadvantages in the stability, glue adhesion and coatability of the wood. For example, reactive adhesive or coating systems based on polyurethanes may not react or may do so only to an insufficient extent if the pH of the substrate was changed by the flameproofing composition. The mechanical stability may also deteriorate as a result of a flame-retardant treatment.

In order to meet high fire protection requirements while using a small amount, halogen-containing flameproofing compositions for wood were proposed, for example halogen phosphonates in U.S. Pat. No. 2,725,311 and halogen phosphites and halogen phosphates in U.S. Pat. No. 3,285,774. The halogen content is responsible for good efficiency. The high fume densities and fume toxicities in the event of a fire are disadvantages of these substances. In addition, halogen-containing flameproofing compositions no longer meet society's requirements regarding product safety and environmental protection.

Flameproofing compositions based on ammonium salts of phosphoric acid or polyphosphoric acids are frequently used for the flame-retardant treatment of wood. They have the disadvantage that their flameproofing effect is low and they therefore have to be combined with further substances, for example with boron compounds, in order to improve the effect.

SP REPORT 2006:30 (Swedish National Testing and Research Institute) describes the use of phosphonic acids as flameproofing compositions without giving experimental details. In some experiments in this context, however, serious deficiencies of these flameproofing compositions were evident (cf. Comparative Example V 2)

Stringent and increasingly normative requirements, the change in acceptance of certain chemicals by the public and the described disadvantages of the known flameproofing treatments for wood-base materials lead to a need for novel solutions for the production of flame-retardant wood-base materials. The object of the present invention was to provide compositions and processes for the production of flame-retardant wood-base materials which, on the basis of substances readily available on an industrial scale and in a one-stage treatment, show high efficiency. The compositions sought should be free of halogen-containing substances, free of inorganic phosphates and further co-flameproofing compositions or auxiliaries and should be nonvolatile and readily water-soluble. The properties of the wood, in particular its mechanical stability, should not be adversely affected.

SUMMARY OF THE INVENTION

Surprisingly, it has been found that salts of halogen-free organic phosphonic acids permit, in a simple manner, the production of flame-retardant wood-base materials which meet all requirements. This invention relates to flame-retardant wood-base materials containing, as a flameproofing composition, salts of halogen-free organic phosphonic acids of the formula (I)

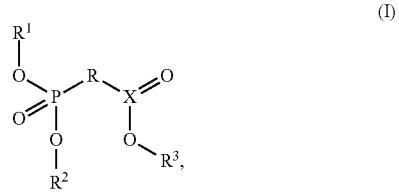

in which
R represents a divalent, straight-chain or branched or cyclic $C_1$- to $C_{10}$-hydrocarbon radical optionally containing up to three nitrogen atoms and optionally substituted by up to four hydroxyl groups,
$R^1$, $R^2$ and $R^3$, independently of one another, represent H, Li, Na, K, Mg/2, Ca/2, Zn/2, Al/3 or $NR^4R^5R^6R^7$, at least one of the radicals $R^1$, $R^2$ and $R^3$ not being H,
X represents C, S=O, or P—O—$R^1$ and
$R^4$, $R^5$, $R^6$ and $R^7$, independently of one another, represent H, straight-chain or branched $C_1$- to $C_{18}$-alkyl, $C_2$- to $C_4$-hydroxyalkyl or benzyl.

In the context of the present invention, wood-base materials are understood as meaning cut sections consisting of solid wood, such as, for example, debarked trunks, planks, beams, strips, sheets, layers, veneers, posts or poles, and furthermore wood particles, such as, for example, chips, chaff, wood wool, sawdust or wood fibres, and finally materials or semifinished products produced from woodcuts or wood particles, such as, for example, plywood, laminated wood, laminates, chipboards and wood fibreboards.

Hardwood or softwood is preferably used for the production of the wood-base materials according to the invention. In particular, the wood species obeche, maple, birch, pear, bubinga, beech, Douglas fir, ebony, yew, oak, ash, alder, eucalyptus, spruce, gabun, chestnut, pine, cherry, larch, lime, mahogany, merbau, meranti, walnut, rosewood, poplar, plane, false acacia, fir, teak, elm, willow, wenge and cedar and the respective subspecies and local varieties are particularly preferred. Also particularly preferred are woody and fibrous constituents of other plants, such as, for example, bamboo, sisal and hemp.

In a preferred embodiment of the invention, the wood-base material contains, as a flameproofing composition, at least one Na, K, Mg, Ca, Zn, Al or $NH_4$ salt of hydroxyphosphonoacetic acid (CAS Reg. No. 23783-26-8), of hydroxyethanediphosphonic acid (CAS Reg. No. 2809-21-4), of 2-phosphonobutane-1,2,4-tricarboxylic acid (CAS Reg. No. 37971-36-1), of nitrilotrismethylenetris(phosphonic acid) (CAS Reg. No. 6419-19-8) or of diethylenetriaminepentakis(methylenephosphonic acid) (CAS Reg. No. 15827-60-8).

The wood-base materials according to the invention may also contain any desired mixture of said salts, it being possible for the mixture to contain different salts of the same cation with the same phosphonic acid, different salts of the same cation with different phosphonic acids, different salts of different cations with the same phosphonic acid or different salts of different cations with different phosphonic acids. The flameproofing composition can be prepared by known methods, as described, for example, in U.S. Pat. No. 3,886,205. In many cases, they are commercially available. The wood-base materials according to the invention may contain further flameproofing compositions customary for this purpose, in addition to the salts of halogen-free organic phosphonic acids. Salts of phosphoric acid with nitrogen-containing cations, e.g. ammonium phosphate, salts of di- or polyphosphoric acid with nitrogen-containing cations, e.g. ammonium polyphosphate, hydroxy-functional esters of organic phosphonic acids, e.g. 3-(dimethylphosphono)-N-(hydroxymethyl)propionamide, boron compounds, e.g. sodium tetraborate, nitrogen compounds, e.g. urea, melamine and guanidine derivatives, or silicon compounds, e.g. silicones, are suitable for this purpose.

The wood-base materials according to the invention are produced by treating optionally pretreated wood in the form of cut sections, wood particles or semifinished wood products with said salts of halogen-free organic phosphonic acids in a manner known per se.

The invention also relates to compositions for the production of flame-retardant wood-base materials, characterized in that these compositions contain salts of halogen-free organic phosphonic acids corresponding to the formula (I).

In a preferred embodiment of the invention, the compositions are solutions or dispersions of said salts of halogen-free organic phosphonic acids in water or water-containing solvents. The solutions or dispersions contain the salts in concentrations of 0.1 to 80% by weight, based on the solution, preferably of 1 to 40% by weight. The solutions or dispersions have a pH of 1 to 12, preferably of 2 to 10. The solutions or dispersions may contain further additives, such as, for example, compositions for adjusting or regulating the pH, antimicrobial wood preservatives, wetting auxiliaries or dispersants.

The invention also relates to a process for the flame-retardant treatment of wood-base materials, characterized in that woodcuts, wood particles or semifinished wood products are treated with salts of halogen-free organic phosphonic acids corresponding to the formula (I).

In a preferred embodiment of the invention, the above-described solutions or dispersions of said salts of halogen-free organic phosphonic acids in water or water-containing solvents are introduced into the wood-base material in the treatment by spraying, spreading, immersion or the pressure process or by combinations of such methods. The treatment is particularly preferably carried out as a pressure process.

The treatment may be carried out at atmospheric pressure, at reduced pressure down to 0.001 bar or at superatmospheric pressure up to 50 bar. It is preferably carried out at temperatures of 0 to 150° C. The known impregnation variants, namely the pressure process, the low-pressure process, the diffusion process or steeping, may be used. The impregnation may comprise subsequent drying of the wood-base material.

The woodcuts, wood particles or semifinished wood products used in the process according to the invention may be treated in the form with the moisture content immediately after felling or in predried form. They may be pretreated in various ways, for example by kiln drying, paint removal, bleaching, washing out of wood constituents or antimicrobial treatment.

The woodcuts, wood particles or semifinished wood products treated according to the invention can be further modified in subsequent processing steps in order to improve performance characteristics, such as insensitivity to water, weather and UV radiation, resistance to microbes and insects, flame retardance, dimensional stability or mechanical stability. For these purposes, they may be oiled, varnished, coated, thermally treated, acetylated, silanized or furfurylized by methods known per se.

The wood-base materials according to the invention or wood-base materials produced by compositions and processes according to the invention do not differ in appearance and properties from untreated wood-base materials and can be very readily further processed. By means of the salts of halogen-free organic phosphonic acids used in the treatment, high flame retardance is achieved.

The invention finally also relates to the use of the wood-base materials described as building timber, particularly in the interior area, for example in the roof truss, in ceiling and wall constructions, as material for the production of interior fittings, for example as ceiling or wall cladding or floor covering, as material for the production of pieces of furniture, built-in cabinets, trade fair stands and shop fittings and as material for the interior decoration of means of transport, for example automobiles, railway carriages, aircraft and ships, as starting materials for further treated semifinished wood products, e.g. chipboards and wood fibreboards, or as filler or reinforcing material in wood-containing composite materials, preferably wood-plastic composites or mineral-bound building materials.

The invention is explained in more detail with reference to the following examples without it being intended to limit the invention thereby. The percentages denote percentages by weight.

The flameproofing compositions used in Examples E1 to E7 according to the invention and in Comparative Example C2 were prepared by the method from Example 1 in U.S. Pat. No. 3,886,205.

EXAMPLES

A. Flame Retardance and Mechanical Stability

TABLE 1

Flameproofing compositions used.

| Example | Flameproofing composition | Concentration [%] of the aqueous solution |
|---|---|---|
| C 1 | none | 0 |
| C 2 | 2-phosphonobutane-1,2,4-tricarboxylic acid | 25 |
| E 1 | 2-phosphonobutane-1,2,4-tricarboxylic acid tetrasodium salt | 25 |
| E 2 | 2-phosphonobutane-1,2,4-tricarboxylic acid diammonium salt | 25 |
| E 3 | 2-phosphonobutane-1,2,4-tricarboxylic acid triammonium salt | 25 |

Production of the Test Specimens

Test specimens comprising spruce wood (125 mm×30 mm×5 mm), which were produced from commercially available battens by sawing off, were used for the fire test. Before the treatment with the flameproofing compositions, the test specimens were conditioned for 2 days at 23° C. and 50% relative humidity. Their mass $m_1$ were then weighed. They were then placed in an aqueous solution of the flameproofing compositions stated in Table 1 according to type and concentration. The immersion bath was evacuated in a vacuum chamber to a pressure of 50 mbar and left there at 23° C. for 10 min. Finally, ventilation was effected, the test specimens were removed from the immersion bath after 10 min, thoroughly dabbed dry, dried for 2 h at 60° C. and then conditioned for 2 days at 23° C. and 50% relative humidity and their mass $m_2$ was weighed. The flameproofing composition content stated in Table 2 in % corresponds to $(m_2-m_1)/m_2 \times 100$.

For comparison, corresponding test specimens were treated in the same way. However, only demineralized water was used instead of a solution of a flameproofing composition (Comparative Example C 1).

The test specimens of the treatment according to the invention and of the comparative treatment were not distinguishable with regard to appearance, handle and odour.

Determination of the Flame Retardance

Fire testing of the test specimens was carried out in a small burner test. For this purpose, the test specimens were clamped vertically and a 2 cm long ignition flame was applied at an angle of 45° C. at the lower edge for 20 s. After removal of the ignition flame, it was assessed whether the sample extinguishes by itself or continues to burn. After extinction, a 2 cm long ignition flame was applied once again to the test specimens for 20 s. After the second removal of the ignition flame, it was again assessed whether the sample extinguishes by itself or continues to burn or after-glowing occurs. The results are listed in Table 2.

Determination of the Tensile Strength

Two marks 20 mm apart were made with a felt pen on both sides of the predetermined breaking point on a beech wood test specimen (125 mm×30 mm×5 mm) treated as described above with flameproofing composition. The test specimen was then clamped in the clamping jaws of a Lloyd tensile strength tester and the laser beam of an Ametek laser extension sensor was adjusted onto the marks (zero value). The sample was now torn at a take-off speed of 20 mm/min and the tension as a function of the extension of the sample was electronically logged. The maximum value of the tension in the stress-strain curve corresponds to the tensile strength. The experiment was repeated for 10 test specimens per flameproofing composition and for comparison for 10 untreated test specimens and the mean value of the tensile strengths determined thereby are shown in Table 2.

TABLE 2

Results for ComparativeExamples C1 and C2 and Examples E1 to E3 according to the invention

| | Example | | | | |
|---|---|---|---|---|---|
| | C 1 | C 2 | E 1 | E 2 | E 3 |
| Flameproofing composition content [%] | 0 | 8 | 20 | 12 | 10 |
| Self-extinguishing after 1st flame application | no | yes | yes | yes | yes |
| Self-extinguishing after 2nd flame application | no | yes | yes | yes | yes |
| After-glow | — | no | no | no | no |
| Tensile strength [N/mm$^2$] | 129 | 61 | 118 | 133 | — |

Evaluation

The test specimens treated according to the invention extinguish by themselves after flame application whereas the test specimen from Comparative Example C 1 without flameproofing composition underwent complete combustion. The treatment in Comparative Example C 2 not according to the invention also leads to self-extinguishing behaviour. However, the tensile strength of the test specimen from Comparative Example C 2 is very substantially below the tensile strength of untreated wood. Surprisingly, the tensile strength of test specimens which were treated with the flameproofing compositions according to the invention scarcely differed from the tensile strength of untreated wood. It is therefore clear that the treatment according to the invention with salts of halogen-free organic phosphonic acids leads to flame-retardant wood-base materials which are not inferior to untreated wood in their mechanical stability. In contrast, the corresponding treatment with the phosphonic acids themselves leads to substantially poorer mechanical stability.

B. Quantitative Comparison with Conventional Flameproofing Composition

TABLE 3

Flameproofing compositions used.

| Example | Flameproofing composition |
|---------|---------------------------|
| C 3 | none |
| C 4 | VP 11647, from IGP Flammschutzmittel, Dülmen (flameproofing composition for wood based on an inorganic phosphate) |
| E 4 | 2-phosphonobutane-1,2,4-tricarboxylic acid monoammonium salt |
| E 5 | 2-phosphonobutane-1,2,4-tricarboxylic acid diammonium salt |
| E 6 | 2-phosphonobutane-1,2,4-tricarboxylic acid triammonium salt |
| E 7 | 2-phosphonobutane-1,2,4-tricarboxylic acid tetraammonium salt |

Thermogravimetry (TGA)

90 parts of beech wood flour and 10 parts of one of the flameproofing compositions stated in Table 3 were thoroughly mixed with one another. A known starting amount of this mixture was heated in an open crucible in the air at a heating rate of 10° C./min to 500° C. and the change in mass of the crucible was electronically logged. The other flameproofing compositions and, for comparison, a sample of pure beech wood flour were investigated in the same way. The proportion by mass remaining after reaching 500° C. in relation to the starting amount is shown in Table 4.

Two-Stage Isothermal Carbonization 90 parts of beech wood flour and 10 parts of one of the flameproofing compositions stated in Table 3 were thoroughly mixed with one another. A known starting amount of this mixture was stored in the air for 2 h at 300° C. and then for 2 h at 350° C., then cooled and weighed. The other flameproofing compositions and, for comparison, a sample of pure beech wood flour were investigated in the same way. The remaining proportion by mass in relation to the starting amount is shown in Table 4.

TABLE 4

Results for Comparative Examples C3 and C4 and Examples E4 to E7 according to the invention

| Example | TGA residue at 500° C. [%] | Carbon formation after thermal storage [%] |
|---------|----------------------------|--------------------------------------------|
| C 3 | 2 | 7 |
| C 4 | 10 | 18 |
| E 4 | 38 | 27 |
| E 5 | 34 | 23 |
| E 6 | 34 | 23 |
| E 7 | 34 | 26 |

Evaluation

Sufficient carbon formation under thermal load shields the fuel from the heat source and from the oxygen supply and therefore leads to poorer fire properties and finally to extinguishing of the flame. The measurement of the carbon formation is therefore a possibility for quantitatively comparing the efficiency of different flameproofing compositions.

Both in the dynamic carbonization in TGA and in the two-stage isothermal carbonization, it is found that the flameproofing compositions according to the invention of Examples E 4 to E 7 form substantially more carbon than the conventional phosphate-based flameproofing composition in Comparative Example C 4. The untreated wood in Comparative Example C 3 forms virtually no carbon at all. It is therefore clear that the treatment according to the invention of wood-base materials leads to improved flame retardance compared with the prior art.

What is claimed is:

1. A flame-retardant wood-base material selected from the group consisting of debarked trunks, planks, beams, strips, sheets, layers, veneers, posts, poles, plywood, laminated wood, laminates, chipboards and wood fiberboards, containing as flameproofing compositions, salts of halogen-free organic phosphonic acids of the formula (I)

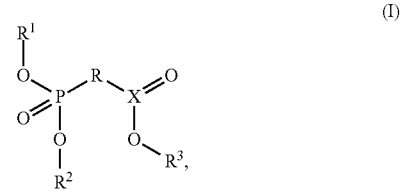

wherein

R represents a divalent, straight-chain or branched or cyclic $C_1$- to $C_{10}$-hydrocarbon radical optionally containing up to three nitrogen atoms and optionally substituted by up to four hydroxyl groups, $R^1$, $R^2$ and $R^3$, independently of one another, represent H, or $NR^4R^5R^6R^7$, at least one of the radicals $R^1$, $R^2$ and $R^3$ not being H, X represents C, S=O, or P—O—$R^1$ and $R^4$, $R^5$, $R^6$ and $R^7$, independently of one another, represent H, straight-chain or branched $C_1$- to $C_{18}$-alkyl, $C_2$- to $C_4$-hydroxyalkyl or benzyl and/or at least one $NH_4$ salt of 2-phosphonobutane-1,2,4-tricarboxylic acid, $NH_4$ salt of nitrilotrismethylenetris (phosphonic acid), and $NH_4$ salt of diethylenetriamine-pentakis(methylenephosphonic acid).

2. A wood-base material according to claim 1, wherein at least one $NH_4$ salt of hydroxyphosphonoacetic acid, of hydroxyethanediphosphonic acid, of 2-phosphonobutane-1, 2,4-tricarboxylic acid, of nitrilotrismethylenetris(phosphonic acid) or of diethylenetriamine-pentakis(methylenephosphonic acid) are contained as flameproofing compositions.

3. A process for the flame-retardant treatment of wood-base materials selected from the group consisting of debarked trunks, planks, beams, strips, sheets, layers, veneers, posts, poles, plywood, laminated wood, laminates, chipboards and wood fiberboards, wherein said wood-base materials are woodcuts, wood particles or semifinished wood products are treated by spraying, spreading, immersing, pressure processing or by combinations thereof with salts of halogen-free organic phosphonic acids of the formula (I)

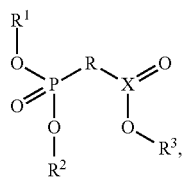 (I)

in which

R represents a divalent, straight-chain or branched or cyclic $C_1$- to $C_{10}$-hydrocarbon radical optionally containing up to three nitrogen atoms and optionally substituted by up to four hydroxyl groups, $R^1$, $R^2$ and $R^3$, independently of one another, represent H or $NR^4R^5R^6R^7$, at least one of the radicals $R^1$, $R^2$ and $R^3$ not being H, X represents C, S=O, or P—O—$R^1$ and $R^4$, $R^5$, $R^6$ and $R^7$, independently of one another, represent H, straight-chain or branched $C_1$- to $C_{18}$-alkyl, $C_2$- to $C_4$-hydroxyalkyl or benzyl and/or with at least one $NH_4$ salt of 2-phosphonobutane-1,2,4-tricarboxylic acid, $NH_4$ salt of nitrilotrismethylenetris(phosphonic acid), and $NH_4$ salt of diethylenetriamine-pentakis(methylenephosphonic acid).

4. A process according to claim 3, wherein at least one $NH_4$ salt of hydroxyphosphonoacetic acid, of hydroxyethanediphosphonic acid, of 2-phosphonobutane-1,2,4-tricarboxylic acid, of nitrilotrismethylenetris(phosphonic acid) or of diethylenetriaminepentakis(methylenephosphonic acid) is used.

5. A process according to claim 3, wherein the treatment is carried out as a pressure process and solutions or dispersions of said salts of halogen-free organic phosphonic acids in water or water-containing solvents are used thereby.

* * * * *